June 8, 1965

H. N. STEPHAN 3,187,636

ROTARY WORKTABLE

Filed Nov. 21, 1963

INVENTOR.
HALLIS N. STEPHAN
BY Hudson, Boughton,
Williams, David & Hoffmann
ATTORNEYS June 8, 1965
H. N. STEPHAN
3,187,636
ROTARY WORKTABLE
Filed Nov. 21, 1963
2 Sheets-Sheet 2
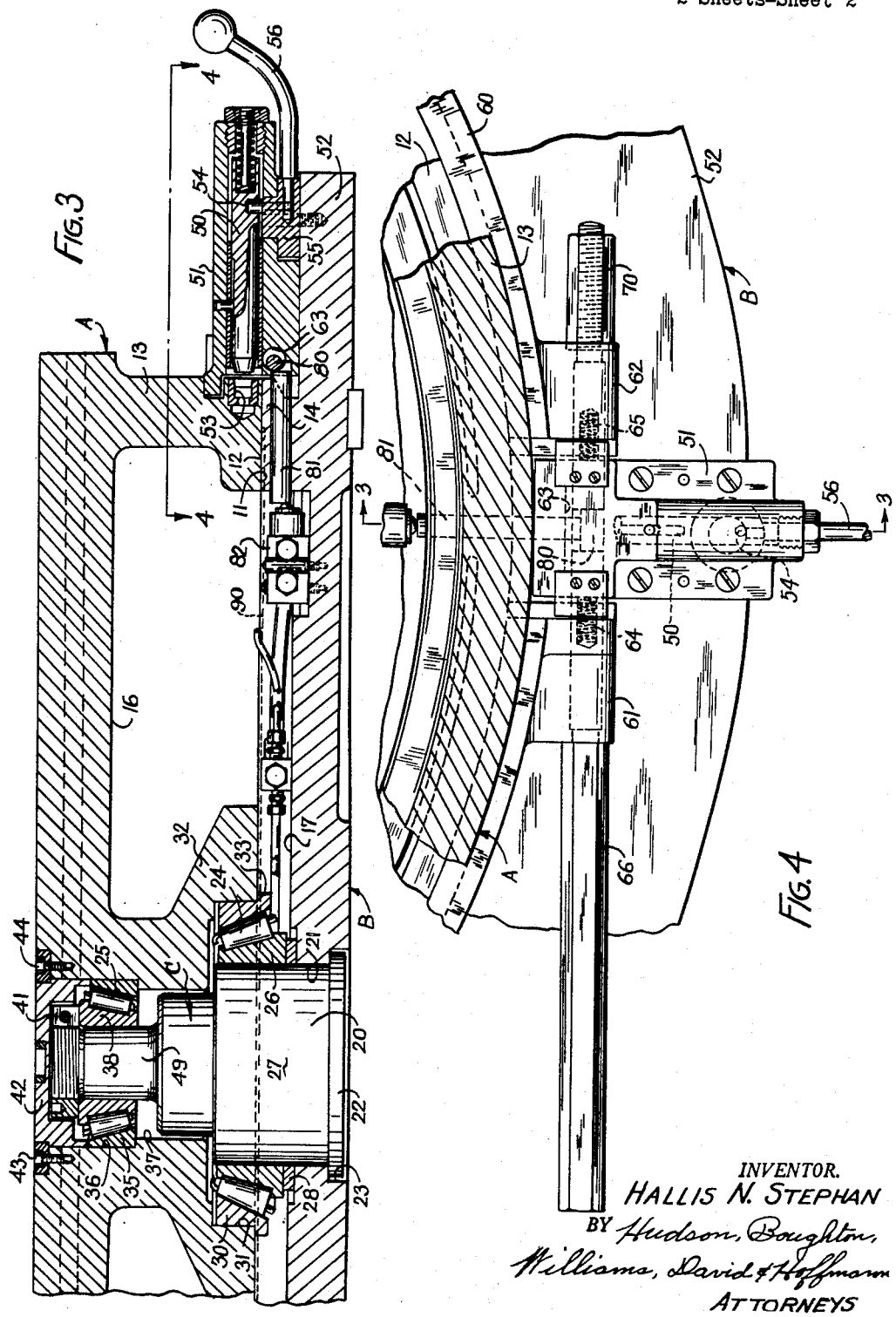
INVENTOR.
HALLIS N. STEPHAN
BY Hudson, Boughton,
Williams, David & Hoffmann
ATTORNEYS

United States Patent Office 3,187,636
Patented June 8, 1965

3,187,636
ROTARY WORKTABLE
Hallis N. Stephan, Shaker Heights, Ohio, assignor to The New Britain Machine Company, New Britain, Conn., a corporation of Connecticut
Filed Nov. 21, 1963, Ser. No. 326,322
8 Claims. (Cl. 90—58)

The present invention relates to machine tools and more particularly to so-called rotary worktables having an annularly indexible or positionable table supported upon a base by means including cooperating way surfaces, at least one of which is annular. The benefit of 35 U.S.C. 120 is claimed for this application which is a continuation-in-part of now abandoned U.S. applications, Serial No. 656,894 filed May 3, 1957, Serial No. 833,180 filed August 12, 1959 and Serial No. 30,325 filed May 19, 1960. The disclosures of said applications including the specification and drawings thereof are incorporated herein by reference.

Worktables of the character mentioned are adapted to support relatively heavy work pieces and great difficulty is encountered in moving the tables thereof and in turn the work carried thereby at relatively slow uniform speeds and/or locating the same in precise angular positions because of the inertia of the mass being moved and the tendency of the table to stick to the member or base upon which it is supported, due, at least in part, to the fact that oil introduced between the supporting ways squeezes out, especially when the table is at rest.

The invention contemplates the provision of a new and improved rotary worktable which will be free of the objectionable characteristics of the prior art and which includes a work supporting member or table rotatably supported upon a base by means including cooperating ways or way surfaces one of which is annular and means for supplying at an automatically maintained substantially constant mass flow rate air or other gaseous fluid, preferably air having small particles of oil therein, between the ways of the movable table and its base or supporting member at a plurality of discrete places or locations to separate the ways thereof a predetermined amount and/or relieve them of at least part of the load therebetween during movement of the table relative to its support.

The invention resides in certain constructions and combinations and arrangements of parts, and further objects and advantages thereof will be apparent to those skilled in the art to which it relates from the following description of the preferred embodiment described with reference to the acompanying drawings forming a part of this specification, in which:

FIG. 3 is a fragmentary sectional view, with portions in elevation, approximately on the line 3—3 of FIG. 2, and FIG. 4 is a fragmentary sectional view, with parts broken away, approximately on the line 4—4 of FIG. 3.

Figure 1:
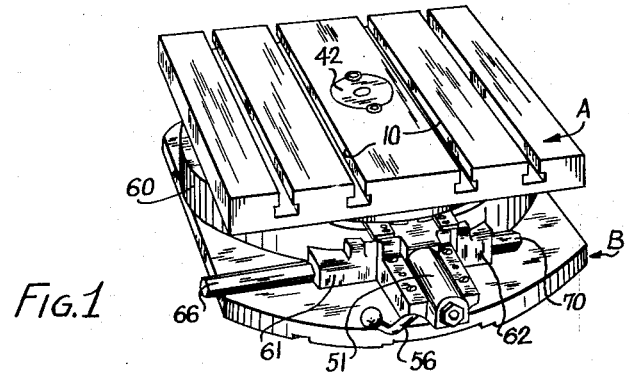
FIG. 1 is a perspective view of a rotary worktable embodying the present invention.
Figure 2:
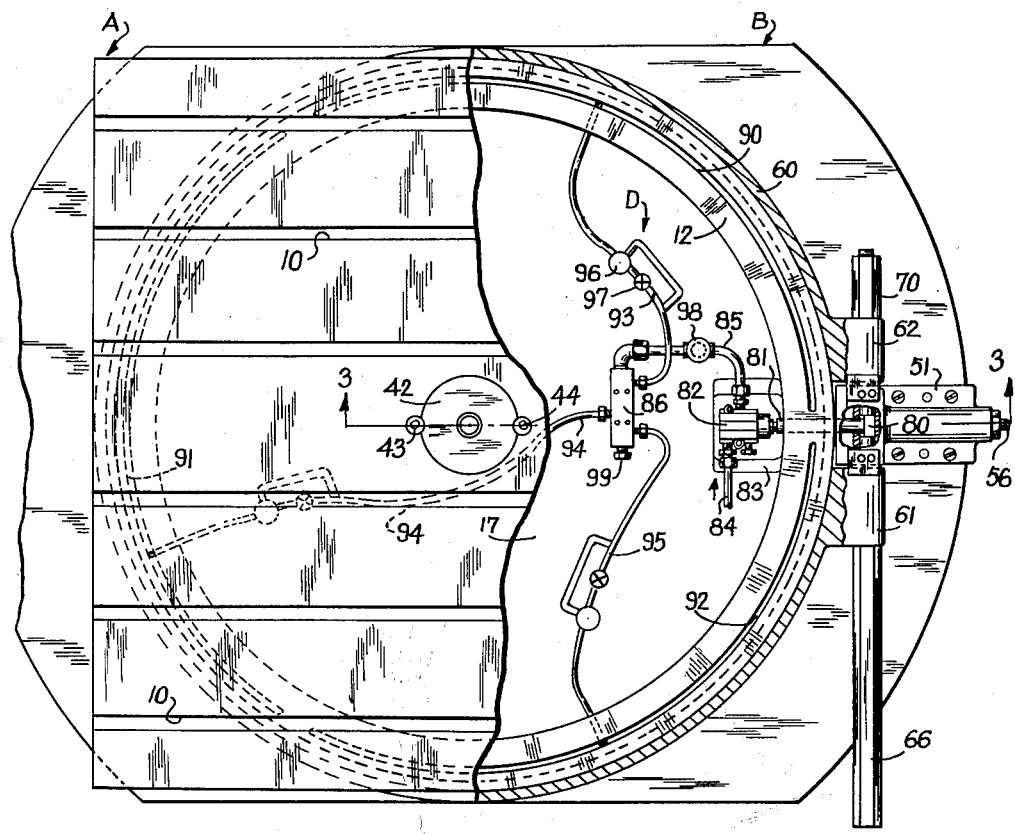
FIG. 2 is a plan view of the worktable shown in FIG. 1 with parts broken away and in section to show the interior construction.

Although the invention is applicable to the moving and positioning or indexing of various types of members which it is desired to rotate and/or locate in a predetermined angular position, it is herein shown and described as embodied in a rotary worktable of the type normally employed with horizontal boring, drilling and milling machines.

Referring to the drawings, the reference character A designates a table member rotatably supported upon a base member B adapted to be detachably bolted or otherwise secured to the worktable of a machine tool, i.e., a horizontal boring, drilling and milling machine. The table A, which has a plurality of T-slots 10 in its upper surface for the attachment thereto of a work piece to be machined, is rotatably supported upon the base B by a central pivot assembly, designated generally as C, and cooperating annular ways 11, 12 formed on the adjoining ends of downwardly and upwardly projecting annular flanges or bosses 13, 14 of the table A and base B, respectively. The annular flanges or bosses 13, 14 are spaced outwardly of the center pivot assembly and in the embodiment shown are spaced therefrom by apertures 16, 17 on the adjoining sides of the table and base members A, B, respectively.

The pivot assembly C comprises a stepped pivot member or shaft 20 extending upwardly through a suitable aperture 21 in the base B located centrally of the upwardly facing annular flange 14 on the base and having a head 22 received in a counterbore 23 in the underside of the base B. The table A is rotatably supported on the pivot member or shaft 20 by two pairs of vertically spaced tapered roller bearings 24, 25, the rollers of which converge toward one another. The inner race 26 of the lower bearing 24 is secured to the large diameter portion 27 of the pivot shaft 20 and rests against a spacer member 28 located in a shallow counterbore in the upper side of the base B. The outer race 30 of the lower bearing is secured in a counterbore 31 in the lower end of a central boss 32 on the under side of the table A. The race is provided at its lower edge with a radially projecting flange 33, the upper side of which abuts against the under surface of the table A.

The outer race 35 of the upper bearing 25 is secured in a counterbore 36 in the upper end of a stepped aperture 37 through the table A and into which aperture the upper end of the pivot shaft 20 projects. The inner race 38 of the upper bearing 25 is slidably supported upon the reduced upper end portion 40 of the pivot shaft 20 and the bearings, the rollers of which converge toward each other, are adapted to be adjusted and preloaded, if desired, by a clamp nut 41 threaded onto the upper projecting end of the pivot shaft 20. The lower edge of the clamp nut 41 bears against the upper edge of the inner race 38 of the upper bearing 25.

The upper end of the aperture 37 in the table A into which the pivot pin or shaft projects is normally closed by a cup-shaped cap member 42 located in the upper part of the aperture and having its upper surface flush with the top or upper surface of the table A. The cap member 42 is secured in the table A by two set screws 43, 44 threaded into suitable tapped apertures in the table A and having their heads recessed in washers, which washers are in turn recessed in the table A and the cap 42 and overlie portions of the table and cap members.

The table A is adapted to be rotated by hand and provision is made for securing it in certain predetermined angular positions by providing a spring presed bolt-like member 50 slidably supported in a bracket 51 bolted to a forwardly projecting flange portion 52 of the base B and which member is adapted to be selectively engaged in one of a plurality of apertures 53 suitably spaced about the lower periphery of the boss 13 of the table A. The bolt-like member 50 is spring pressed or biased toward the center of the table A and is adapted to be moved in the opposite direction by manipulation of a manual lever by the operator and selectively retained in its disengaged or inoperative position by a pin 54 eccentrically connected to the upper side of a member 55 rotatably supported in the bracket 51. The pin 54 engages within a transverse slot in the underside of the bolt-like member 50 and the member 55 is provided with a handle 56 for rotating the same through some suitable angle, for example, 90° to 180°.

When the handle 56 is in the positions shown in FIG. 1 the frusto-conical end of the member 50 is spring projected into one of the apertures 53 and when in the position shown in the other views the pin 54 is on center with respect to the axis of rotation of the member 55. The arrangement is such that when the handle is moved from its position in FIG. 1 to the position shown in the other views the bolt 50 is cammed to its retracted position by pin 54 and retained in its retracted position without attention from the operator.

The table A is also adapted to be releasably clamped to the base by the operator in any position which it might occupy thereon by a split clamp ring 60, the front ends of which terminate adjacent to the bracket or member 51 and are provided with forwardly projecting bosses 61, 62 at opposite sides of the member 51. The bosses 61, 62 have aligned apertures therein which also align with an aperture 63 in the member 51. The bosses 61, 62 and in turn the ends of the clamp ring are normally biased in directions away from the member 51 by compression springs 64, 65 interposed between the bosses and the member 51 and are adapted to be drawn towards each other and the member 51 by rotation of a hexagonal clamp shaft 66 by the operator. The shaft 66 has cylindrical portions located in the apertures in the member 51 and the bosses 61, 62 and a threaded end projecting to the outside of the boss 62, which end is provided with a hexagonal nut 70, the end of which, adjacent to the boss 62, engages within a shallow hexagonal aperture in the boss 62 which prevents rotation of the nut relative to the boss. The bosses 61, 62 and the ends of the clamp ring 60, of which they are a part, are moved towards each other upon rotation of the shaft 60 in one direction and permitted to move away from each other upon rotation of the shaft 60 in the opposite direction.

The clamp ring 60 is channel-like in cross-section with the upper and lower flanges projecting inwardly into suitable annular grooves in the peripheries of the boss 13 of the table A and the annular flange 14 of the base B. The upper flange of the clamp ring 60 is rectangular in cross-sectional shape but the lower flange has an upper surface inclined downwardly towards the axis of the rotation of table A and which engages and cooperates with the upper surface of the annular aperture in the base B, which surface is inclined upwardly in an outwardly direction. The construction is such that as the ends of the split clamp ring 60, provided with the bosses 61, 62 are drawn together, the table A is drawn in a downwardly direction into tight engagement with the base B, the engagement being between the ways 11 and 12 of the table and base, respectively.

The clamp shaft 66 is adapted to be rotated 180° from one position in which the table is clamped to the base to a second position in which the table is unclamped. The central portion of the clamp shaft within the aperture 63 of member 51 has an eccentric section 80, which upon rotation of the shaft to unclamp the table reciprocates a plunger 81 slidably supported in a suitable aperture in the boss 14 of the base B for movement radially of the table pivot C. The inner end of the plunger 81 engages and actuates an air valve 82 normally biased to its closed position and secured to the base B within a second recess 83 in the bottom of the recess or aperture 17 in the base B, previously referred to. The valve 82 is located between a conduit 84 connected to a source of pressure fluid, not shown, and a conduit 85 leading to a header 86 and is adapted to control the application of fluid under pressure to the header 86 and in turn to a plurality of arcuate shaped apertures 90, 91, 92 located in the way 12 and equally spaced about the center of the table. The apertures or grooves 90, 91, 92 are connected to the header 86 by discrete conduit means 93, 94, 95 each of which includes an automatic mass and volumetric flow control regulator D of well known construction for controlling the flow of fluid to the apertures and maintaining a substantially constant mass and volumetric flow to the respective apertures. The flow control regulators shown each comprise a pressure regulator 96 and an adjustable needle valve 97 connected in the conduit means between the header 86 and the various grooves 90, 91, 92, with the needle valve on the header side of the pressure regulator and the control chamber of the pressure regulator connected to the header side of the needle valve. The arrangement is such as to provide a constant predetermined mass and volumetric flow of fluid to each of the grooves in the way 12 under variable down stream conditions, when the valve 82 is open. As previously mentioned air is the preferred fluid and an air line lubricator 98 is preferably employed to supply the air with small particles of oil, thus producing something in the nature of an oil mist. The lubricator is preferably located in the conduit leading from the valve 82 to the header 86.

Assuming that air under substantially uniform temperature and pressure, such as is available in all shops using air tools, is supplied to the conduit 84, that the clamp 60 and the valve 82 are closed, the clamp will be released and the valve 82 opened upon rotation of the shaft 66 through 90°. This will permit air to flow through the conduit 85 and the oil lubricator 98 to the header 86 and from the header through the conduits 93, 94, 95 to the grooves 90, 91, 92, respectively. The air admitted to the grooves in the way 12 will lift the table or tend to lift the table depending upon the pressure of the fluid source and the load upon the table. The flow controls D will regulate and maintain substantially constant the amount of air admitted to the respective grooves which amounts will be preferably equal, and the air passing through the lubricator 83 will pick up certain amounts of oil. This, together with the air supplied between the ways 11 and 12, will facilitate rotation of the table A upon the base B and/or its positioning in a predetermined desired location.

The amount of air admitted to the grooves 90, 91 and 92 can be regulated by adjusting the needle valves of the automatic mass flow regulators. The table A can be raised or lifted predetermined amounts and maintained level within the degrees of accuracy demanded by the present state of the art irrespective of whether the load is centered thereon or is asymmetrical because of the arrangement of the grooves symmetrical about the center of the table and the control over the amount of air admitted thereto. In many instances it may also be desirable to preload the center bearing of the table, as explained above, so that a predetermined air pressure will be required before the ways actually separate and permit the escape of air from the ways.

The automatic constant mass flow controllers D, shown, are of the constant differential type.

Alternatively, any suitable automatic fluid flow control apparatus which will maintain a constant mass in the case of gaseous fluid or volumetric flow in the case of incompressible fluids may be employed. For example, the gaseous fluid flow control apparatus shown in United States patents to Bryant, No. 2,650,607 and Comeau, No. 2,662,547.

In the preferred embodiment of the invention shown, the apertures 16 and 17 within the cooperating base and table ways together with the central bore 37 in the table A, the upper end of which is closed by the cap 42, form a closed chamber and any air escaping inwardly of the table from the grooves in the way 12 will exert a pressure on the underside of the table which will assist any pressure produced between the ways 11 and 12 in raising the table A or counterbalancing the load thereon.

As an alternative construction the way grooves may be omitted and fluid pressure merely applied to the interior of the table A as through the open fitting 99 in the header 86. This has certain advantages because of the relatively large area thus subjected to air pressure but has the disadvantages of making it more difficult to maintain the table level with an asymetrical load thereon in the event sufficient fluid pressure is applied to lift the table. As previously mentioned, this situation can, however, be corrected, at least in part, by preloading the table bearings.

While three arcuate shaped grooves 90, 91, 92 are employed in the preferred embodiment disclosed, it will be understood that any desired number of grooves may be employed. It is, however, preferable that the grooves be arranged symetrically about the center of the table, and that the automatic flow control regulators of the character mentioned be employed in at least three equally spaced grooves.

While the invention has been described in considerable detail it is not limited to the construction shown and it is the intention to cover hereby all adaptations, modifications and changes therein which come within the practice of those skilled in the art to which it relates.

Having thus described my invention, I claim:

1. In a device of the character described a first member and a second member having cooperating way surfaces on their adjacent sides one of which is an annular way surface, means preventing relative movement between said members transversely of the center of said annular way surface while permitting relative rotation between said members about said center, one of said members having a plurality of discrete apertures in the side thereof adjacent to the other of said members, said apertures being angularly positioned with respect to said center and spaced from one another, said apertures being closed except for the openings thereof facing said other of said members and being located inwardly of the outer periphery of said annular way surfaces, discrete conduit means communicating with said apertures, and means for supplying gaseous fluid to each of said conduit means at predetermined constant mass flow rates.

2. In a device of the character described a first member and a second member having cooperating way surfaces on their adjacent sides one of which is an annular way surface, means preventing relative movement between said members transversely of the center of said annular way surface while permitting relative rotation between said members about said center, one of said members having a plurality of discrete apertures in the side thereof adjacent to the other of said members, said apertures being angularly positioned with respect to said center and spaced from one another, said apertures being closed except for the openings thereof facing said other of said members and being located inwardly of the outer periphery of said annular way surface, conduit means communicating with said apertures and adapted to be connected to a source of fluid under pressure, valve means in said conduit means for controlling the application of fluid under pressure to said apertures, and discrete constant mass flow control regulator means in said conduit means for automatically controlling and maintaining constant the mass flow of fluid under pressure to each of a plurality of said apertures.

3. In a device of the character described a first member having an annular way surface on its upper side, a second member having an annular way surface on its underside normally in engagement with said way surface on said first member, means preventing relative movement between said members transversely of the centers of said way surfaces while permitting relative rotation between said members about said centers, one of said members having a plurality of apertures in said way surface thereof located inwardly of the inner and outer peripheries of said way surface, conduit means communicating with said apertures and adapted to be connected to a source of gaseous fluid under pressure, valve means in said conduit means for controlling the application of fluid under pressure to said apertures, and discrete automatic constant mass flow control regulator means in said conduit means for automatically controlling and maintaining constant the mass flow of fluid under pressure to each of a plurality of said apertures.

4. In a device of the character described, a first member and a second member having cooperating way surfaces on their adjacent sides one of which is an annular way surface, means for preventing relative movement between said members transversely of the center of said annular way surface while permitting relative rotation between said members about said center, one of said members having a central aperture in the side thereof adjacent to the other of said members closed except for the opening thereof facing said other member and which opening is essentially coextensive with the inner periphery of said annular way surface, one of said members having a plurality of discrete apertures in the side thereof adjacent to the other of said members angularly positioned with respect to said center and spaced from one another, said last named apertures being closed except for the openings thereof facing said other of said members and located between the inner and outer peripheries of said annular way surface, conduit means communicating with said last named apertures and adapted to be connected to a source of gaseous fluid under pressure, valve means in said conduit means for controlling the application of fluid under pressure to said apertures, and discrete automatic constant mass flow control regulator means in said conduit means for automatically controlling and maintaining constant the mass flow of gaseous fluid under pressure to each of a plurality of said last named apertures.

5. In a device of the character described a first member and a second member having cooperating way surfaces on their adjacent sides one of which is an annular way surface, means applying pressure between said way surfaces and preventing relative movement between said members transversely of the center of said annular way surface while permitting relative rotation between said members about said center, one of said members having an aperture in the side thereof adjacent to the other of said members, said aperture being closed except for the opening thereof facing said other of said members, said opening being essentially coextensive with the inner periphery of said annular way surface, conduit means communicating with said aperture and adapted to be connected to a source of fluid under pressure, and valve means in said conduit means for controlling the application of fluid under pressure to said aperture.

6. In a device of the character described a first member and a second member having cooperating way surfaces on their adjacent sides one of which is an annular way surface, means applying pressure between said way surfaces and preventing relative movement between said members transversely of the center of said annular way surface while permitting relative rotation between said members about said center, one of said members having a plurality of discrete apertures in its way surface angularly positioned with respect to said center and spaced from one another, conduit means communicating with said apertures and adapted to be connected to a source of fluid under pressure, valve means in said conduit means for controlling the application of gaseous fluid under pressure to said apertures, and discrete constant mass flow control regulator means in said conduit means for automatically controlling and maintaining constant the mass flow of gaseous fluid under pressure to each of a plurality of said apertures.

7. In a device of the character described a first member having an annular way surface on its upper side, a second member having an annular way surface on its underside normally in engagement with said way surface on said first member, means applying pressure between said way surfaces and preventing relative movement between said members transversely of the centers of said way surfaces while permitting relative rotation between said members about said centers, one of said members having a plurality of discrete apertures in its said way surface, conduit means communicating with said apertures and adapted to be connected to a source of gaseous fluid under pressure, valve means in said conduit means for controlling the application of fluid under pressure to said apertures, and discrete automatic constant mass flow control regulator means in said conduit means for automatically controlling and maintaining constant the mass flow of fluid under pressure to each of a plurality of said apertures.

8. In a device of the character described, a first member and a second member having cooperating way surfaces on their adjacent sides one of which is an annular way surface, means applying pressure between said way surfaces, means for providing relative rotation between said members transversely of the center of said annular way surface while permitting relative rotation between said members about said center, one of said members having a central aperture in the side thereof adjacent to the other of said members closed except for the opening thereof facing said other member and essentially coextensive in area with the inner periphery of said annular way surface, one of said members having a plurality of discrete apertures in the side thereof adjacent to the other of said members angularly positioned with respect to said center and spaced from one another, said last named apertures being closed except for the openings thereof facing said other of said members and located between the inner and outer peripheries of said annular way surface, conduit means communicating with said last named apertures and adapted to be connected to a source of fluid under pressure, valve means in said conduit means for controlling the application of gaseous fluid under pressure to said apertures, and discrete automatic constant mass flow control regulator means in said conduit means for automatically controlling and maintaining constant the mass flow of fluid under pressure to each of a plurality of said last named apertures.

No references cited.

WILLIAM W. DYER, JR., *Primary Examiner.*